United States Patent
Lenniger

(10) Patent No.: US 12,409,698 B2
(45) Date of Patent: Sep. 9, 2025

(54) METHOD FOR OPERATING AN ACTIVE CHASSIS OF A MOTOR VEHICLE

(71) Applicant: Dr. Ing. h.c. F. Porsche Aktiengesellschaft, Stuttgart (DE)

(72) Inventor: Christoph Lenniger, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 83 days.

(21) Appl. No.: 18/423,392

(22) Filed: Jan. 26, 2024

(65) Prior Publication Data
US 2024/0317012 A1    Sep. 26, 2024

(30) Foreign Application Priority Data
Mar. 24, 2023   (DE) ............... 10 2023 107 449.0

(51) Int. Cl.
*B60G 17/08* (2006.01)
*B60G 17/052* (2006.01)
*B60L 50/60* (2019.01)

(52) U.S. Cl.
CPC .......... *B60G 17/08* (2013.01); *B60G 17/052* (2013.01); *B60L 50/60* (2019.02); *B60G 2202/152* (2013.01); *B60G 2202/24* (2013.01); *B60G 2202/412* (2013.01); *B60G 2202/413* (2013.01); *B60G 2500/10* (2013.01); *B60G 2500/205* (2013.01); *B60G 2600/70* (2013.01)

(58) Field of Classification Search
CPC .... B60G 2400/5182; B60G 2400/7162; B60G 2600/70; B60G 2500/10; B60G 2500/205; B60G 2202/322; B60G 2202/412; B60G 2202/413; B60G 2202/24; B60G 2202/152; B60G 17/052; B60G 17/08
See application file for complete search history.

(56) References Cited

U.S. PATENT DOCUMENTS

| | | | |
|---|---|---|---|
| 2015/0224845 A1* | 8/2015 | Anderson | B60G 17/052 701/37 |
| 2018/0313424 A1* | 11/2018 | Leonard | F16F 9/049 |
| 2020/0164711 A1* | 5/2020 | Tuhro | B60G 17/0523 |
| 2023/0249512 A1* | 8/2023 | Belter | B60G 17/027 280/5.514 |

FOREIGN PATENT DOCUMENTS

DE     102015016654 B4     12/2018

* cited by examiner

*Primary Examiner* — James A English
(74) *Attorney, Agent, or Firm* — Buchanan Ingersoll & Rooney PC

(57) ABSTRACT

A method for operating an active vehicle chassis including a control device; a damper device having a hydraulic cylinder and a hydraulic piston; a pump for generating a pressure via the hydraulic piston; a gas spring having a pneumatic cylinder and a pneumatic piston; and a compressor for generating a pressure via the pneumatic piston. In the case of a command for a request for an increased resulting force of the active chassis with the aid of an increased pressure level in the gas spring, the method includes the steps of increasing the pressure in the damper device by way of the pump; increasing the pressure in the gas spring by way of the compressor; and upon reaching the requested increased resulting force, reducing the pressure in the damper device, such that the increased resulting force is adjusted as required using the increased pressure level in the gas spring.

10 Claims, 2 Drawing Sheets

METHOD FOR OPERATING AN ACTIVE CHASSIS OF A MOTOR VEHICLE

CROSS-REFERENCE TO RELATED APPLICATION

This application claims priority to German Patent Application No. 10 2023 107 449.0, filed Mar. 24, 2023, the content of such application being incorporated by reference herein in its entirety.

FIELD OF THE INVENTION

The invention relates to a method for operating an active chassis of a motor vehicle, a chassis for a motor vehicle, a motor vehicle having such a chassis, a computer program with such a motor vehicle, and a computer program product having such a computer program.

BACKGROUND OF THE INVENTION

In some motor vehicles, both active dampers and air springs are provided, which are connected in series or in parallel with one another. They have an overlapping task, namely to provide a force. However, the air spring and active damper have different response times. An active damper is very fast and an air spring takes significantly longer. On the other hand, the energy consumption in the static case is very high for an active damper and significantly lower for an air spring. It is a goal to dimension a compressor for the air spring for the static case.

It is problematic that adjustment requirements for the air spring at least with such a small sized compressor can only be implemented unacceptably slow for a vehicle occupant.

SUMMARY OF THE INVENTION

The invention relates to a method for operating an active chassis of a motor vehicle, wherein the active chassis comprises at least the following components:
 a control device for controlling the chassis;
 at least one damper device having a hydraulic cylinder and a hydraulic piston pressurized on both sides by means of a hydraulic fluid;
 a pump for generating a pressure via the hydraulic piston;
 at least one gas spring having a pneumatic cylinder and a pneumatic piston pressurized with a pneumatic gas on both sides; and
 a compressor for generating a pressure via the pneumatic piston.

The method is characterized in particular in that the control device executes the method for operating the active chassis, which, in the case of a command to or from the control device for a request for an increased resulting force of the active chassis with the aid of an increased pressure level in the gas spring, comprises at least the following steps:
 a. by means of the pump, increasing the pressure in the damper device;
 b. by means of the compressor, increasing the pressure in the gas spring; and
 c. upon reaching the requested increased resulting force, reducing the pressure in the damper device, such that the increased resulting force is adjusted as required using the increased pressure level in the gas spring.

Unless explicitly stated otherwise, ordinal numbers are used in the preceding and the following description only for the purposes of clear distinction and do not reflect any order or ranking of the designated components. An ordinal number greater than one does not imply that another such component has to necessarily be present.

For example, the active chassis proposed herein is of conventional design and can be controlled by means of a control device. The control device is a separate unit for each damper device for the entire chassis of a motor vehicle or is a central unit, for example integrated into an on-board computer. The damper device is designed as described above and comprises a hydraulic piston in a hydraulic cylinder pressurized on both sides by means of a hydraulic fluid in a hydraulic cylinder, wherein the lower side of the hydraulic piston in use is loaded with a higher force than the upper side of the hydraulic piston in use, such that a force for holding the motor vehicle at a desired level results with the same pressure on both sides of the hydraulic piston. The different force at the same pressure on both sides is created by the difference between the two opposing areas of the hydraulic piston.

In order to be able to actively change this force, a pump is provided which is driven by a high-voltage electric drive motor, such that a pressure in the hydraulic cylinder can be changed. A differential pressure can be produced via the hydraulic piston due to the arrangement of the pump or connection lines, or preferably only in interaction with the at least one control valve 1, preferably two control valves 12. With a pure pressure change, the pressure ratio via the hydraulic piston pressurized on both sides remains (at least technically) at one, i.e., the pressure on both sides remains the same. A consequence of the pressure change is thus a change in the force and hardness of the damping.

When generating a differential pressure, the ratio of pressures on the two opposite sides of the hydraulic piston is changed and thus, for example, a level change is achieved without a change in hardness and thus damping properties or at least with less influence on the damping properties. Thus, for example, it is possible to raise the motor vehicle overall without significantly changing the damping properties and/or to raise the motor vehicle when cornering via the wheel on the outside of the bend and lower the wheel on the inside of the bend, such that more comfortable and possibly more stable cornering is enabled.

Furthermore, a hydraulic pressure accumulator is provided with which an operating pressure is provided. Thus, a (technically constant) operating pressure is maintained, even if the pump is not currently operating. The pressure accumulator is connected in such a way that it is not loaded when the pressure is reduced or increased by the pump, for example by means of the at least one control valve 12 and/or at least one corresponding check valve, which is preferably passively designed. A pressure change is thus not passed on to the pressure accumulator, thus achieving a high pump efficiency.

Furthermore, a gas spring (for example an air spring) is provided, which is connected in series or parallel with the damper device. The gas spring comprises a pneumatic cylinder and a pneumatic piston guided therein, which is also pressurized on both sides, but with a pneumatic gas (for example air). Here, too, an area difference is advantageously formed so that a force is generated with the same pressure applied on both sides.

For example, the chassis, which represents at least possible embodiments of the method for operating the active chassis, is described further below.

When an increased force, preferably for static operation, is now requested on the gas spring, such as to increase the motor vehicle level, the method proposed herein is performed.

In step a. the pressure in the damper device is increased by means of the pump, although such a command is not present or, if such a command is present in parallel, the pressure is increased (superimposed) beyond this other requirement. In the latter case, the pressure increase is superimposed (or added) by the pump to another request for a pressure increase to the damper device. Furthermore, in a step b. the pressure in the gas spring is increased as required according to the current requirements for an increased resulting force on the gas spring.

In step c., once the requested pressure level in the gas spring is reached, the pressure on the damper device is reduced again so that the requested resulting force is set as a result. It should be noted that different embodiments of this method are possible:

In one embodiment, the damper device is brought to a pressure that corresponds to the request for the gas spring. In one embodiment, the pressure on the damper device is only increased at times and never brought to a level corresponding to the requested pressure increase on the gas spring. In one embodiment, the pressure on the damper device is not reduced until the requested pressure increase on the gas spring is reached. In one embodiment, the pressure on the damper device is already reduced if the requested pressure on the gas spring is not yet reached. In one embodiment, the resulting force from the pressure increase in the damper device and the pressure increase in the gas spring is at least temporarily higher than required. It should be noted that combinations of the embodiments are also possible as well as further embodiments not yet mentioned.

In one preferred embodiment, the requested increased resulting force is never exceeded by the pressure increase on the damper device and the pressure increase on the gas spring. In one embodiment, step a. is completed first and then step b. is performed. In one embodiment, step a. is discontinued once step b. is completed and then step c. is performed.

It is further proposed in an advantageous embodiment of the method that step c. is carried out such that the reduction of the requested pressure is carried out such that the resulting force of the active chassis remains technically constant together from the changing pressure in the damper device and the oppositely changing pressure in the gas spring.

In this embodiment, the pressure increase in the damper device and the pressure increase in the gas spring are matched to one another, such that the requested resulting force remains constant (at least to an extent noticeable by a vehicle occupant). For example, in one embodiment, the requested resulting force is initially built up in step a. by the damper device alone. The pressure in the gas spring is then increased in step b., wherein at the same time the pressure in the damper device is reduced accordingly in step c. In one embodiment, step a. and step b. take place simultaneously, wherein upon reaching the increased resulting force requested from the sum of the forces of the damper device and the gas spring, the pressure in the damper device is reduced again to the extent that the pressure in the gas spring is further increased until the increased resulting force is provided entirely by the gas spring. The damper device then returns to its operating pressure state.

In a specific embodiment of the method, the following steps are carried out in the order mentioned to support the gas spring [GaFe], preferably for a compressor, which can provide the necessary pressure but whose performance is very low when a request is made for the gas spring (for example, raising the body height level):

i. the (active) damper device [ADR] first implements this request alone:

$$F_{ADR} = F_{ADR,dyn} + F_{GaFe,stat} \tag{1}$$

with $F_{ADR}$ as the overall force of the damper device, $F_{ADR,dyn}$ as the dynamic force requirement of the damper device and $F_{GaFe,stat}$ as the static force requirement of the gas spring.

ii. the compressor pumps air into the gas spring, which takes (significantly) longer than the damper device due to the low performance of the compressor and, in a cost-efficient implementation, also longer than a customer would accept [0 . . . 100% corresponds to an increase factor of zero to one that increases over time]:

$$F_{GaFe} = 0..100\% \ F_{GaFe,stat} \tag{2}$$

with $F_{GaFe}$ as the total force of the gas spring and $F_{GaFe,stat}$ as the static force requirement of the gas spring.

iii. Meanwhile the (active) damper device reduces the exact amount of force (reciprocally) that the pump gradually builds up. Vehicle occupants notice nothing about the force transfer [100 . . . 0% corresponds to a decreasing acceptance factor over time from one to zero]:

$$F_{ADR} = F_{ADR,dyn} + (100..0\% \ F_{GaFe,stat}) \tag{3}$$

iv. at the end, the air spring bears the load alone:

$$F_{GaFe} = 100\% \ F_{GaFe,stat}; \text{ and} \tag{4.1}$$

$$F_{ADR} = F_{ADR,dyn}(+0\% \ F_{GaFe,stat}). \tag{4.2}$$

Again, it should be noted that this method or the request for an increased resulting force and the corresponding steps a., b. and c. can certainly be carried out with other dynamic requirements superimposed. For example, the reduction of the pressure in the damper device in a state is then superimposed by a required pressure increase for another requirement (for example, greater hardness of the wheel on the outside of the bend), resulting in the following on the damper device:
 no complete reduction,
 no reduction or
 even an increase in pressure.

It is further proposed in one advantageous embodiment of the method that step b. is not started until the requested pressure in the damper device is set.

This embodiment has the advantage that at any one time a single consumer of the chassis is controlled. In addition, in this first section, controlling or regulating the increased resulting force is particularly simple. Reducing the pressure on the damper device is usually a passive process in which no electrical energy is absorbed in the chassis and thus the sequential performance of step a. and step b. as well as the simultaneous performance of step b. and step c. in the embodiment in which the resulting force is technically kept constant is therefore particularly efficient because no particularly high performance is requested.

It is further proposed in one advantageous embodiment of the method that the request for the resulting force follows a command to increase the chassis level.

For example, to switch from city or highway driving operation to off-road driving or to make it easier to get out of a vehicle that is too low, it is often desirable to increase the chassis level. An alternative request for which an increased resulting force is requested is, for example, an uneven weight distribution in the motor vehicle, which is taken into account with an individual adjustment of the resulting force on a single wheel or single axle. It should be noted that with a level change set once (apart from refilling with relatively increased pressure due to leakage), there is no reduced or increased performance demand on the gas spring.

Proposed according to a further aspect is a chassis for a motor vehicle, which is an active chassis, comprising at least the following components:

a control device for controlling the chassis;
at least one damper device having a hydraulic cylinder and a hydraulic piston pressurized on both sides by means of a hydraulic fluid;
a pump for generating a pressure via the hydraulic piston;
at least one gas spring having a pneumatic cylinder and a pneumatic piston pressurized with a pneumatic gas on both sides; and
a compressor for generating a pressure via the pneumatic piston, wherein the control device is configured to execute a method according to an embodiment according to the above description.

For example, the active chassis proposed herein is embodied as described above, and in this respect, reference is made to the foregoing description. In a preferred embodiment, the chassis is a single wheel system (an active wheel suspension), which is designed and controlled or regulated independently of the other wheels. In another embodiment, the chassis is provided for a wheel axis, i.e., two wheels, wherein a single damper device is then preferably provided for each wheel. In a further embodiment, the chassis is designed with all necessary damper devices for a motor vehicle, for example four damper devices, for the four wheels of a passenger vehicle.

Furthermore, a gas spring, for example an air spring, is provided, which is connected in series or parallel with the damper device. The gas spring comprises a pneumatic cylinder and a pneumatic piston guided therein, which is also pressurized on both sides, but with a pneumatic gas (for example air). Here, too, an area difference is advantageously formed so that a force is generated with the same pressure applied on both sides. When an increased force, preferably for static operation, is now requested on the gas spring, such as to increase the motor vehicle level, the method proposed herein is performed.

Proposed according to a further aspect is a motor vehicle, which comprises at least the following components:

at least one, preferably high-voltage electric, particularly preferably battery electric, traction machine and at least one drive wheel, which can be driven by means of the traction machine to propel the motor vehicle, wherein a respective drive wheel and/or a further wheel of the motor vehicle is suspended in pairs or individually suspended by means of a chassis according to an embodiment according to the above description and is suspended and damped by means of at least one damper device in each case.

The motor vehicle proposed herein comprises a traction machine, for example an internal combustion engine or an electric motor, or a plurality of traction machines, for example designed as a hybrid or purely electric, each with an electric motor and/or a wheel hub drive in at least one of the drive wheels of the motor vehicle on a vehicle axle. By means of the at least one traction machine, propulsion of the motor vehicle can be generated via the drive wheels, usually two or four. The driving behavior of the motor vehicle is stabilized via the active chassis in regular operation.

The chassis is thus equipped with a particularly efficiently sized compressor with a fast responsiveness and at the same time the statically efficient gas spring can be used for a static request.

According to a further aspect, a computer program is proposed, comprising a computer program code, wherein the computer program code can be executed on at least one computer, such that the at least one computer is prompted to carry out the method according to an embodiment according to the above description, wherein at least one unit of the computer is arranged in an on-board computer of a motor vehicle, preferably according to one embodiment according to the above description.

The method for operating an active chassis of a motor vehicle described herein is computer-implemented in accordance with this embodiment. The computer-implemented method is stored as computer program code, wherein the computer program code, when executed on a computer comprising, for example, a data memory and a processor, causes the computer to carry out the method according to one embodiment according to the above description. For example, the computer-implemented method is realized by a computer program, wherein the computer program comprises the computer program code, wherein when executed on a computer, the computer program code causes the computer to carry out the method according to one embodiment according to the above description. The term "computer program code" refers to one or more instructions or commands, which cause a computer to perform a number of operations, which constitute an algorithm and/or other processing methods, for example.

Preferably, the computer program can be partially or entirely executed on an on-board computer and/or on a separate control device. The term "computer" is used herein with the same meaning as the devices known from the prior art. Accordingly, a computer comprises one or more general-purpose processors (CPU) or microprocessors, RISC processors, GPU, and/or DSP. For example, the computer comprises additional elements such as memory interfaces or communication interfaces. Optionally or additionally, the terms refer to such a device that is capable of executing a provided or integrated program, preferably with standardized programming language (e.g., C++, JavaScript, or Python), and/or controlling and/or accessing data memory devices and/or other devices, such as input interfaces and output interfaces. The term "computer" also refers to a plurality of processors or a plurality of (sub)computers that are interconnected via physical lines and/or otherwise communicatively connected and possibly jointly use one or more other resources, such as a data memory. A (data) memory is, for example, a hard drive (HDD) or a (non-volatile) solidstate memory, for example a ROM memory or flash memory [Flash EEPROM]. The memory often comprises a plurality of separate physical units or is distributed to a plurality of separate devices so that access thereto takes place via data communication, for example package data service. The latter is a remote solution, in which memory and processors of a plurality of separate computers are used instead of a (single) central server or in addition to a central server.

According to a further aspect, a computer program product is proposed on which a computer program code is stored, wherein the computer program code can be executed on at least one computer such that the at least one computer is prompted to carry out the method according to an embodiment according to the above description, wherein at least one unit of the computer is arranged in an on-board computer of a motor vehicle, preferably according to one embodiment according to the above description.

As a computer program product comprising the computer program code described above, is, for example, a medium, such as RAM, ROM, SD card, memory card, flash memory card or disk, or can be stored on a server and downloaded. Once the computer program is rendered readable via a readout unit, for example a drive, and/or installation, the computer program code and the method contained therein for segmenting objects with their own movement can be executed by a computer or in communication with a plurality of server units, for example according to the above description.

BRIEF DESCRIPTION OF THE DRAWINGS

The above-described invention is discussed in detail in the following in the context of the relevant technical background with reference to the accompanying drawings which show preferred embodiments. The invention is not limited in any way by the purely schematic drawings, whereby it should be noted that the drawings are not true to scale and are not suitable for defining dimensional relationships.

DETAILED DESCRIPTION OF THE INVENTION

Figure 1:
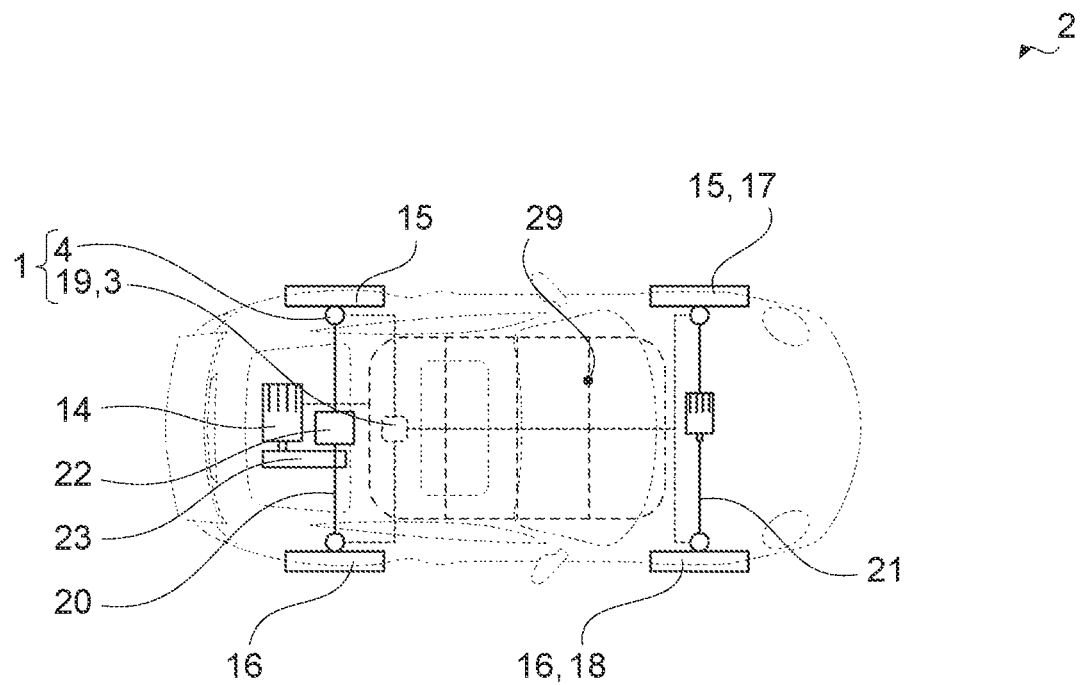
FIG. 1 depicts a motor vehicle having an active chassis.

FIG. 1 shows a motor vehicle 2 having an active chassis 1 in a schematic plan view. For example, the active chassis 1 shown here is of conventional design and can be controlled by means of a control device 3. The control device 3 is designed here as a unit integrated into the on-board computer 19 for all damper devices 4 together of the entire chassis 1 of the motor vehicle 2 and connected to the four damper devices 4 (only one is referred to here as pars-pro-toto) shown here. The motor vehicle 2 shown here also comprises a traction machine 14 in the left (rear) region of the motor vehicle 2 as shown in the illustration and, purely optionally, a second traction machine 14 in the right (front) region of the motor vehicle 2. The traction machines 14 in this embodiment are designed as electric drive motors 8, with the rear traction machine 14 being connected to the rear axle 20 by means of a differential 22 and a transmission 23 so as to transmit torque. The motor vehicle 2 shown is (purely optionally) designed as a battery electric vehicle [BEV], and the traction machines 14 can be supplied with electrical energy by means of an energy storage element 29 (here a high-voltage battery). The rear axle 20 transfers the torque of the traction machine 14 to a left drive wheel 15 and a right drive wheel 16, wherein both drive wheels 15,16 are suspended with damping by means of the active chassis 1 and set up with a parking brake to maintain an upper speed limit. In addition, a left wheel 17 and a right wheel 18 are arranged on the front axle 21, wherein these are also suspended with damping by means of the active chassis 1.

Figure 2:
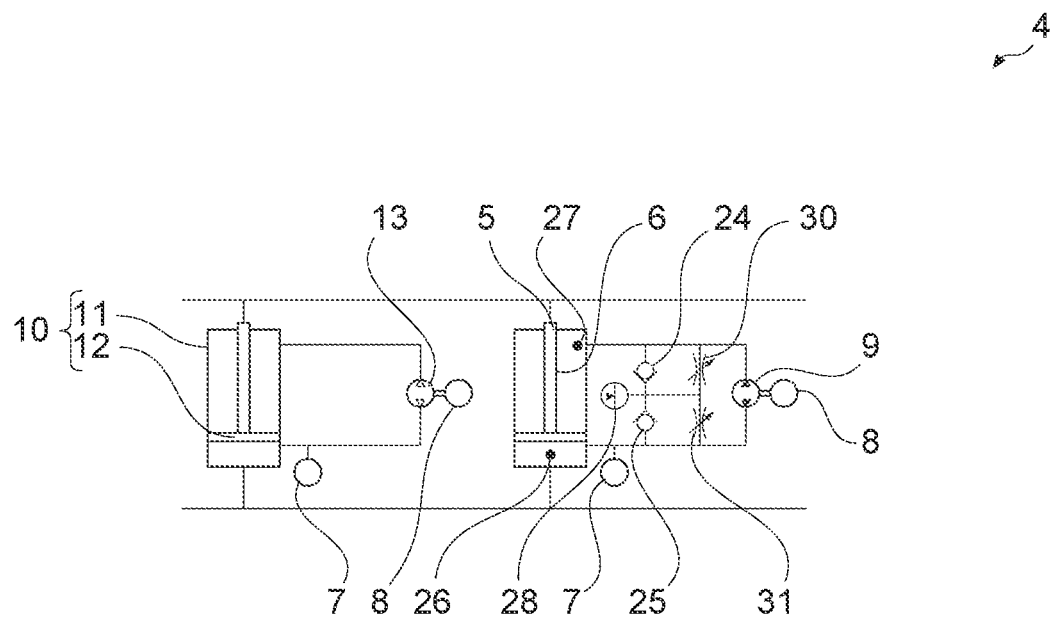
FIG. 2 depicts a damper device having a gas spring of an active chassis in a parallel circuit.

FIG. 2 shows a damper device 4 with a gas spring 10 of an active chassis 1 in a parallel circuit in a schematic circuit view. The damper device 4 comprises a hydraulic cylinder 5 with a movably mounted hydraulic piston 6 and a gas spring 10 arranged parallel to it, which comprises a pneumatic cylinder 11 and a pneumatic piston 12 guided therein. The pressure required to move the pneumatic piston 12 can be provided by means of a compressor 13, wherein the compressor 13 is driven by means of a (preferably electric) drive motor 8. As shown, a sensor 7 is arranged to the right of the gas spring 10 (purely optionally), which measures a temperature and/or a pressure within the lines connecting the gas spring 10 to the compressor 13.

The damper device 4 comprises a hydraulic piston 6 in a hydraulic cylinder 5 which is pressurized on both sides, wherein the lower (i.e., wheel) side of the hydraulic piston 6 as shown and in use is loaded with a higher force than the upper (i.e., chassis) side of the hydraulic piston 6 in use due to the area ratios, such that a force for holding the motor vehicle 2 at a desired level is ensured with the same pressure on both sides of the hydraulic piston 6. The damper device 4 further comprises a pressure accumulator 28, two check valves 24,25 and two throttle valves 30,31. The pressure accumulator 28 can be pressurized by means of a pump 9.

The hydraulic cylinder 5 can be seen in the center of the illustration, in which a hydraulic piston 6 with a piston rod (shown at the top) connected to it can be moved up and down under pressure on both sides. This forms a lower chamber 26 below the hydraulic piston 6, and an upper chamber 27 above the hydraulic piston 6, wherein the piston rod is arranged in the upper chamber 27 and at least this reduces the effective upper piston area compared to the effective lower piston area. The chambers 26,27 are both hydraulically connected to the pressure accumulator 28 and the pump 9 (driven by an electric drive motor 8). The pressure accumulator 28 is protected from pressurization by the pump 9 by means of the check valves 24,25. Preferably, a sensor 7 is provided in at least one of the connection lines (alternatively or additionally in at least one of the chambers 26,27), for example for measuring both pressure and temperature. An exchange rate between the two chambers 26,27 and the pressure accumulator 28 can be controlled by means of the two throttle valves 30,31 or their set throttle position that can be controlled.

Figure 3:
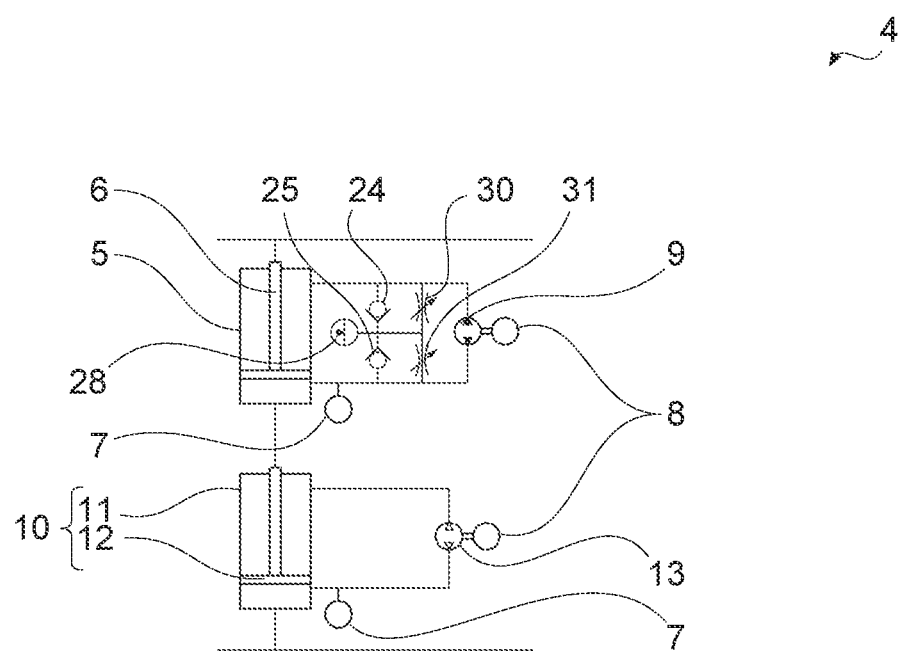
FIG. 3 depicts a damper device having a gas spring of an active chassis in a series circuit.

FIG. 3 shows a damper device 4 with a gas spring 10 of an active chassis 1 in a series connection in a schematic circuit view. The damper device 4 with the gas spring 10 is to a large extent identical to the exemplary embodiment shown in FIG. 2, without exclusion of generalities, and in this respect reference is made to the description therein. Essentially, only the differences are discussed here. The damper device 4 here also comprises a hydraulic cylinder 5 and a hydraulic piston 6 guided therein and a gas spring 10 arranged below the hydraulic cylinder 5 as shown. The gas spring 10 here also comprises a pneumatic cylinder 11 with a pneumatic piston 12 guided therein. However, in this case the pneumatic piston 12 is connected to the hydraulic cylinder 5 and thus only indirectly to the upper (chassis) side as shown, wherein conversely the hydraulic cylinder 5 is only indirectly connected to the lower (wheel) side as shown. Alternatively, the order is reversed and/or the cylinders and pistons are reversed (for example, rotated against each other) while maintaining the direction of the ratio of the effective piston areas.

Figure 4:
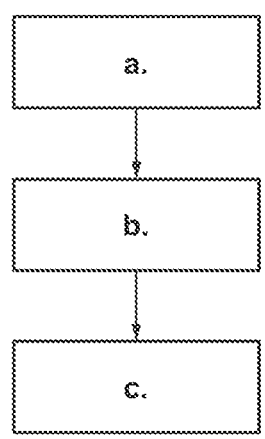
FIG. 4 depicts a flow chart of a method for operating an active chassis.

FIG. 4 shows a flow chart of a method for preconditioning an active chassis 1 of a motor vehicle 2. In the following description, reference is made to the damper device 4 according to FIG. 2 or FIG. 3 and the active chassis 1 according to FIG. 1 purely for the sake for clarity, without limiting the generality, and in this respect reference is made to the description therein.

In a step a. of the method, the pressure is increased in the damper device 4 by means of the pump 9, such that the active chassis 1 carries out a level increase, for example in order to enable a higher body height level for off-road driving.

In the subsequent step b. the pressure in the gas spring 10 is increased so that the gas spring 10, which has a longer response time than the damper device 4, applies the required force. In step c., (at the latest) once the requested pressure in the gas spring 10 is reached, the pressure on the damper device 4 is reduced again so that the requested resulting force is set as a result. The force of the gas spring 10 and the force of the damper device 4 are preferably superposed such that a vehicle occupant does not notice any difference. In an advantageous embodiment, once the force of the gas spring 10, starts to build up, the force of the damper device 4 is (slowly) reduced again, and controlled such that the compressor 13 of the gas spring 10 requires time to build up force in the gas spring 10.

The invention relates to a method for operating an active chassis of a motor vehicle, wherein the active chassis comprises at least the following components:
- a control device for controlling the chassis;
- at least one damper device having a hydraulic cylinder and a hydraulic piston;
- a pump for generating a pressure via the hydraulic piston;
- at least one gas spring having a pneumatic cylinder and a pneumatic piston; and
- a compressor for generating a pressure via the pneumatic piston. The method is characterized in particular in that the control device executes the method for operating the active chassis, which, in the case of a command for a request for an increased resulting force of the active chassis with the aid of an increased pressure level in the gas spring, comprises at least the following steps:
  a. by means of the pump, increasing the pressure in the damper device;
  b. by means of the compressor, increasing pressure in the gas spring; and
  c. upon reaching the requested increased resulting force, reducing the pressure in the damper device, such that the increased resulting force is adjusted as required using the increased pressure level in the gas spring.

With the method proposed herein, a level change of a motor vehicle can be implemented particularly quickly.

The features of the claims can be combined in any technically meaningful manner, for which purpose it is also possible to consult the explanations from the following description and features from the figures, which comprise additional configurations of the invention.

What is claimed is:

1. A method for operating an active chassis of a motor vehicle, wherein the active chassis includes (i) a control device for controlling the chassis; (ii) at least one damper device having a hydraulic cylinder and a hydraulic piston pressurized on both sides by a hydraulic fluid; (iii) a pump for generating a pressure via the hydraulic piston; (iv) at least one gas spring having a pneumatic cylinder and a pneumatic piston pressurized with a pneumatic gas on both sides; and (v) a compressor for generating a pressure via the pneumatic piston,
wherein in an event of a command to or from the control device for a request for an increased resulting force of the active chassis with the aid of an increased pressure level in the gas spring, the control device executes the following steps:
  a. by means of the pump, increasing the pressure in the damper device;
  b. by means of the compressor, increasing pressure in the gas spring; and
  c. upon reaching the requested increased resulting force, reducing the pressure in the damper device, such that the increased resulting force is adjusted as required using the increased pressure level in the gas spring.

2. The method according to claim 1, wherein step c. is carried out such that the reduction of the requested pressure is carried out such that the resulting force of the active chassis remains technically constant together from the changing pressure in the damper device and the oppositely changing pressure in the gas spring.

3. The method according to claim 1, wherein, step b. is only initiated after the requested pressure in the damper device has been set.

4. The method according to claim 1, wherein, the request for the resulting force is followed by a command for a level increase of the chassis.

5. An active chassis for a motor vehicle, said active chassis comprising:
a control device for controlling the chassis;
at least one damper device having a hydraulic cylinder and a hydraulic piston pressurized on both sides by a hydraulic fluid;
a pump for generating a pressure via the hydraulic piston;
at least one gas spring having a pneumatic cylinder and a pneumatic piston pressurized with a pneumatic gas on both sides; and
a compressor for generating a pressure via the pneumatic piston,
wherein, in an event of a command to or from the control device for a request for an increased resulting force of the active chassis with the aid of an increased pressure level in the gas spring, the control device is configured to:
  a. increase the pressure in the damper device by means of the pump;
  b. increase pressure in the gas spring by means of the compressor; and
  c. upon reaching the requested increased resulting force, reduce the pressure in the damper device, such that the increased resulting force is adjusted as required using the increased pressure level in the gas spring.

6. A motor vehicle comprising:
at least one traction machine and at least one drive wheel, which is driven by the traction machine to propel the motor vehicle,
wherein a respective drive wheel and/or a further wheel of the motor vehicle is suspended in pairs or individually suspended by the active chassis according to claim 5 by way of the at least one damper device, in each case.

7. The motor vehicle of claim 6, wherein the at least one traction machine is a high-voltage electric traction machine.

8. The motor vehicle of claim 6, wherein the at least one traction machine is a battery electric traction machine.

9. A computer program comprising a computer program code that can be executed on at least one computer such that the at least one computer is prompted to carry out the method according to claim 1.

10. A computer program product in which a computer program code is stored, wherein the computer program code is executed on at least one computer such that the at least one computer is prompted to carry out the method according to claim 1.

* * * * *